United States Patent

Choi et al.

(10) Patent No.: US 9,417,901 B2
(45) Date of Patent: Aug. 16, 2016

(54) SWITCH AND METHOD FOR GUARANTEEING QUALITY OF SERVICE OF MULTI-TENANT CLOUD SERVICE AND SYSTEM HAVING THE SAME SWITCH

(71) Applicant: Electronics and Telecommunications Research Institute, Daejeon (KR)

(72) Inventors: Kang-Il Choi, Daejeon (KR); Bhum-Cheol Lee, Daejeon (KR); Jung-Hee Lee, Daejeon (KR); Young-Ho Park, Daejeon (KR); Sang-Min Lee, Daejeon (KR); Seung-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 119 days.

(21) Appl. No.: 14/152,708

(22) Filed: Jan. 10, 2014

(65) Prior Publication Data

US 2014/0201738 A1 Jul. 17, 2014

(30) Foreign Application Priority Data

Jan. 11, 2013 (KR) .................. 10-2013-0003631
Jan. 3, 2014 (KR) .................. 10-2014-0000815

(51) Int. Cl.

| G06F 9/46 | (2006.01) |
|---|---|
| G06F 15/173 | (2006.01) |
| G06F 9/455 | (2006.01) |
| H04L 12/24 | (2006.01) |
| H04L 12/931 | (2013.01) |
| H04L 12/721 | (2013.01) |
| H04L 12/725 | (2013.01) |
| H04L 12/717 | (2013.01) |
| H04L 12/851 | (2013.01) |

(52) U.S. Cl.
CPC ........ *G06F 9/45533* (2013.01); *G06F 9/45558* (2013.01); *H04L 41/00* (2013.01); *H04L 45/302* (2013.01); *H04L 45/38* (2013.01); *H04L 45/42* (2013.01); *H04L 47/24* (2013.01); *H04L 49/205* (2013.01); *H04L 49/70* (2013.01); *G06F 2009/4557* (2013.01); *G06F 2009/45595* (2013.01)

(58) Field of Classification Search
CPC .......... G06F 9/4881; G06F 9/50; G04F 67/10
See application file for complete search history.

(56) References Cited

U.S. PATENT DOCUMENTS

| 7,756,027 | B1 * | 7/2010 | Reddy et al. .................. 370/230 |
|---|---|---|---|
| 2010/0257263 | A1 | 10/2010 | Casado et al. |
| 2012/0099591 | A1 | 4/2012 | Kotha et al. |
| 2012/0106546 | A1 | 5/2012 | Sinha |
| 2013/0329725 | A1 * | 12/2013 | Nakil .................. H04L 43/0852 370/360 |
| 2013/0343399 | A1 * | 12/2013 | Kandula et al. ............... 370/412 |

* cited by examiner

*Primary Examiner* — Camquy Truong
(74) *Attorney, Agent, or Firm* — William Park & Associates Ltd.

(57) ABSTRACT

Provided are a method, apparatus, and system for providing a multi-tenant cloud service, which can guarantee quality of service (QOS) in units of flows and virtual machines (VMs). A dynamic virtual flow switch includes a switch flow agent configured to receive and store virtual machine QOS information about each of a plurality of virtual machines operating in a plurality of computer servers and flow QOS information about a flow generated by the virtual machine from a virtual flow controller and a flow processing unit configured to receive the flow generated by the virtual machine and determine a QOS priority of the flow based on the stored virtual machine QOS information of the virtual machine and flow QOS information of the flow.

16 Claims, 5 Drawing Sheets

SWITCH AND METHOD FOR GUARANTEEING QUALITY OF SERVICE OF MULTI-TENANT CLOUD SERVICE AND SYSTEM HAVING THE SAME SWITCH

CROSS-REFERENCE TO RELATED APPLICATION

This application claims priority to and the benefit of Korean Patent Application Nos. 2013-0003631 and 2014-0000815, filed on Jan. 11, 2013 and Jan. 3, 2014, respectively, the disclosures of which are incorporated herein by reference in their entirety.

BACKGROUND

1. Field of the Invention

The present invention relates to a method and system for guaranteeing Quality of Service (QOS) of a multi-tenant cloud service in a server virtualization environment, and more particularly, to a method and system for providing a multi-tenant cloud service, which can guarantee QOS in units of flows and in units of virtual machines (VMs).

2. Discussion of Related Art

Recently, semiconductor technologies are being developed, and thus performance of computer processors is improving highly. Furthermore, as multi-core processor technologies are developed, an amount of tasks that can be simultaneously executed in one computer server is significantly increased. Private data centers in the fields of business and finance have tens to hundreds of computer servers installed therein to provide services (business finance, banking, stock, etc.) in the fields of business and finance. In addition, an Internet data center (IDC) has hundreds or thousands of computer servers installed therein to provide a variety of services (web servers, mail servers, file servers, video servers, cloud servers, etc.) to different service users. In such a multi-tenant environment, there is a need to operate servers integrally to reduce cost and simplify management.

In order to satisfy this need, the concept of server virtualization has been introduced, in which one or more (several, tens of, or hundreds of) different virtual machines may reside in one computer server. Accordingly, there is a need for a solution that can guarantee QOS of a plurality of virtual machines that support multi-tenant service and a plurality of flows generated by the virtual machines in units of virtual machines and in units of flows.

SUMMARY OF THE INVENTION

The present invention is directed to a dynamic virtual flow switch that can guarantee QOS of a plurality of virtual machines that support multi-tenant service and a plurality of flows generated by the plurality of virtual machines in units of virtual machines and in units of flows.

The present invention is also directed to a network system that can guarantee QOS of a plurality of virtual machines that support multi-tenant service and a plurality of flows generated by the plurality of virtual machines in units of virtual machines and flows.

The present invention is also directed to a method for managing QOS at a dynamic virtual flow switch in units of virtual machines and flows.

According to an aspect of the present invention, there is provided a dynamic virtual flow switch including: a switch flow agent configured to receive and store virtual machine QOS information about each of a plurality of virtual machines operating in a plurality of computer servers and flow QOS information about a flow generated by the virtual machine from a virtual flow controller; and a flow processing unit configured to receive the flow generated by the virtual machine and determine a QOS priority of the flow based on the stored virtual machine QOS information of the virtual machine and flow QOS information of the flow.

The dynamic virtual flow switch may further include at least one of an L2 switch and an L3 switch configured to perform connection with the plurality of computer servers.

The virtual machine QOS information may include at least one of real-time/non-real-time attribute information, high/low bandwidth requirement information, delay sensitive/non-sensitive service attribute information, service traffic directionality information, and virtual machine bandwidth information about a service provided by the virtual machine.

The flow QOS information may include at least one of real-time/non-real-time attribute information, high/low bandwidth requirement information, delay sensitive/non-sensitive service attribute information, and service traffic directionality information.

When the virtual machine is generated by a virtual machine manager, the virtual machine QOS information may be set by the virtual machine manager and delivered to the virtual flow controller.

When flow traffic is generated by the virtual machine, the generated flow traffic may be delivered to the virtual flow controller and the flow QOS information about the flow may be set by the flow controller.

The flow processing unit may determine a QOS priority of the flow such that the flow is preferentially processed if the flow has flow QOS information corresponding to at least one of the virtual machine information for the virtual machine that has generated the flow.

The switch flow agent may periodically receive and update the virtual machine QOS information and the flow QOS information from the virtual flow controller.

According to another aspect of the present invention, there is provided a network system including: a virtual machine manager configured to generate a plurality of virtual machines and set virtual machine QOS information about each of the generated plurality of virtual machines; a virtual flow controller configured to receive and store the virtual machine QOS information about each of the plurality of virtual machines from the virtual machine manager and set and store flow QOS information about a flow generated by the virtual machine; a plurality of computer servers configured to execute at least one of the plurality of virtual machines generated by the virtual machine manager and have an edge flow agent for forwarding a new traffic to the virtual flow controller when the new flow traffic is generated by the virtual machine; and a dynamic virtual flow switch configured to receive and store the virtual machine QOS information and the flow QOS information from the virtual flow controller and when a flow is received from each of the plurality of computer servers, determine a QOS priority of the flow based on the stored virtual machine QOS information and flow QOS information and process the flow.

The dynamic virtual flow switch may be plural in number, and the plurality of dynamic virtual flow switches may be connected over an intranet or the Internet.

The dynamic virtual flow switch may be connected with the plurality of computer servers through at least one of an L2 switch and an L3 switch.

The virtual machine QOS information may include at least one of real-time/non-real-time attribute information, high/low bandwidth requirement information, delay sensitive/non-sensitive service attribute information, service traffic directionality information, and virtual machine bandwidth information about a service provided by the virtual machine.

The flow QOS information may include at least one of real-time/non-real-time attribute information, high/low bandwidth requirement information, delay sensitive/non-sensitive service attribute information, and service traffic directionality information.

The dynamic virtual flow switch may determine a QOS priority of the flow such that the flow is preferentially processed if the flow has flow QOS information corresponding to at least one of the virtual machine information for the virtual machine that has generated the flow.

According to still another aspect of the present invention, there is provided a method of managing QOS for a flow at a dynamic virtual flow switch, the flow being generated by one of a plurality of virtual machines operating in one of a plurality of computer servers and the dynamic virtual flow switch being connected with the plurality of computer servers to receive and process the flow, the method including: calculating a total sum of bandwidth usages of flows generated by the plurality of virtual machines; comparing the total sum of bandwidth usages of flows with a network bandwidth between the dynamic virtual flow switch and the computer server; when the total sum of flow bandwidth usages is greater than the network bandwidth, comparing a flow bandwidth usage of a flow generated by each of the plurality of virtual machines with a bandwidth setting value of the virtual machine; when the flow bandwidth usage is greater than the bandwidth setting value of the virtual machine, comparing a flow bandwidth usage generated by each of flows generated by the plurality of virtual machines with a bandwidth setting value of the flow; and when the flow bandwidth usage is greater than the bandwidth setting value of the flow, determining a QOS priority for the flow based on the virtual machine QOS information about the virtual machine that has generated the flow and the flow QOS information about the flow.

The determining of a QOS priority for the flow may include determining the QOS priority of the flow such that the flow is preferentially processed if the flow has flow QOS information corresponding to at least one of the virtual machine QOS information about the virtual machine that has generated the flow.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
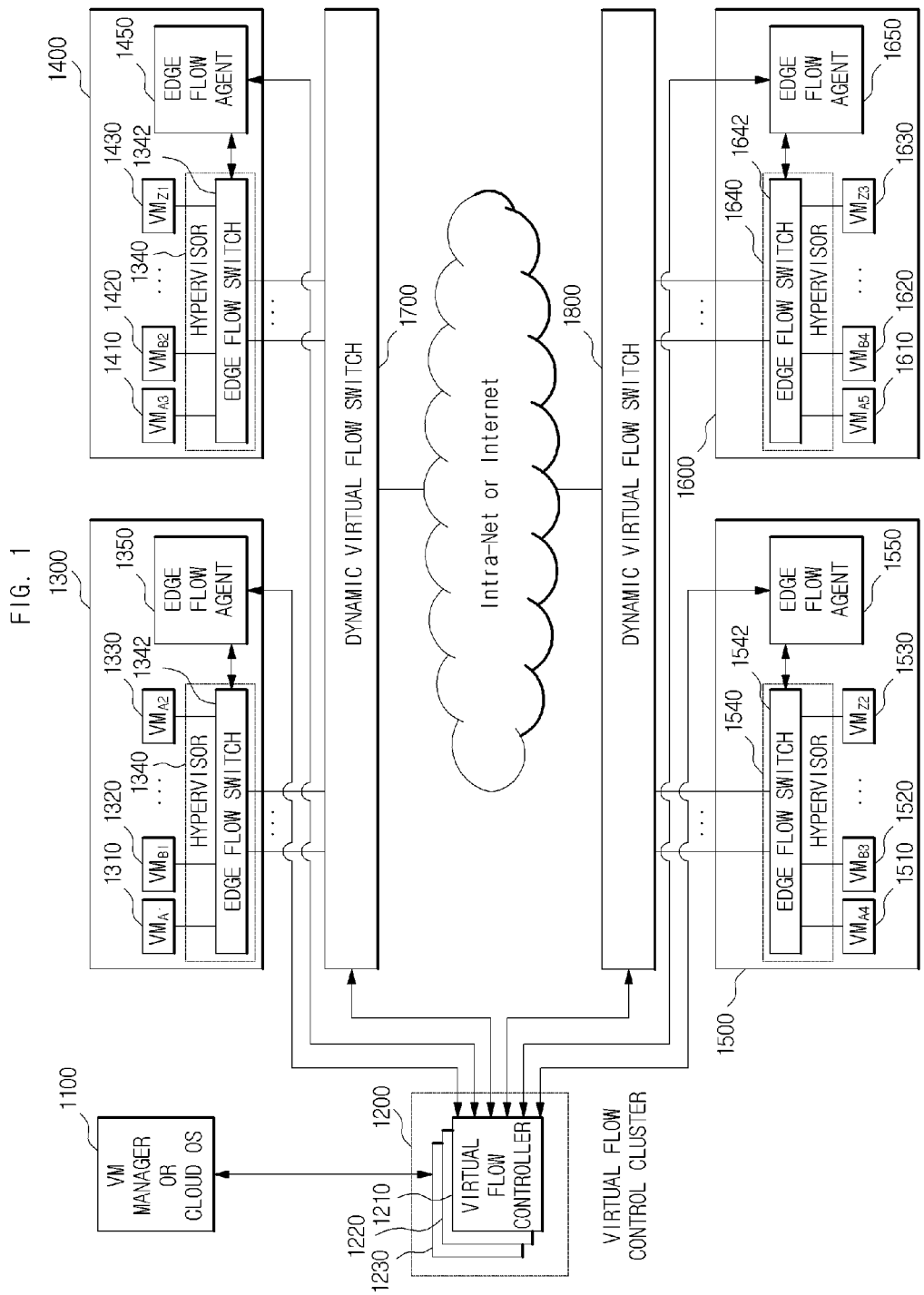
FIG. 1 shows a block diagram of a network system for guaranteeing Quality of Service (QOS) in a multi-tenant cloud service environment according to an embodiment of the present invention.

While example embodiments of the invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Moreover, detailed descriptions related to well-known functions or configurations will be ruled out in order not to unnecessarily obscure subject matters of the present invention.

As used herein, the singular forms "a," "an" and "the" are intended to include the plural forms as well, unless the context clearly indicates otherwise.

Moreover, as used herein, terms "module," "unit," and "interface" generally denote a computer-related object, which may be implemented in hardware, software, or combination thereof.

The present invention proposes a system and method that can provide QOS guarantees to users who use different services by applying a QOS policy in units of flows and virtual machines (VMs) using a dynamic virtual flow switch in a multi-tenant cloud service environment.

In general, several (tens or hundreds of) virtual machines installed in one computer server shares one or more network devices in a multi-tenant cloud service environment. When one or more network devices are shared by one or more virtual machines, the virtual machines should be able to share the network without interfering with each other at a network level. To overcome this limitation, a network virtualization technology has been proposed.

A critical issue in the network virtualization technology is to logically separate network traffic caused by one virtual machine from other network traffic caused by another virtual machine. To overcome the issue of the network virtualization technology, Layer 2 Virtual Local Area Network (VLAN) technology has been introduced. Layer 2 VLAN technology may logically separate the network traffic caused by one virtual machine from network traffic caused by another virtual machine by allowing network traffic caused by each virtual machine to have an independent VLAN ID at a Layer 2 switch of a first stage. This technology is applied and used in almost all Layer 2 switches because modification of the Layer 2 switch is minimized. However, Layer 2 VLAN technology has a limitation in that the number of virtual machines is at most 4096 (VLAN ID of 12 bits). In addition, Layer 2 VLAN technology has another limitation in that it is difficult to establish network connection between different virtual machines within the same hypervisor.

Accordingly, Layer 2 VNTAG technology has also been proposed. Layer 2 VNTAG technology may logically separate network traffic caused by one virtual machine from network traffic caused by another virtual machine by adding additional VNTAG at a Layer 2 switch of a first stage. Layer 2 VNTAG technology may expand an L2 bridge and recognize a virtual network. In addition, advantageously, a virtual network may be set separately, like a physical port. However, Layer 2 VNTAG technology has limitations in that a function of processing VNTAG, which is newly added at an L2 level, should be newly added to the hardware and all Layer 2 switches in a network should support the VNTAG in order to use VNTAG.

With respect to network virtualization, software virtual switch (vSwitch) technology has been introduced recently. In software virtual switch technology, a software virtual switch (vSwitch) is installed in a hypervisor for managing a virtual machine to switch a flow generated by the virtual machine to a physical network interface. The virtual switch (vSwitch) in a hypervisor including start virtual machines detects all flows which are newly generated by all start virtual machines and reports flow information to an openflow controller. The openflow controller generates a new flow entry and a flow ID on the basis of the flow information, and sets the new flow entry and flow ID for a destination server. The openflow controller also generates a flow table of openflow switches to transmit a message for adding new flow IDs to all the openflow switches managed by the controller. The openflow switches set a new flow table on the basis of a flow addition message received from the openflow controller. The start virtual switch transmits network traffic encapsulated with a flow ID. The openflow switch is configured to switch the network traffic encapsulated with the flow ID to a destination virtual switch. The destination virtual switch (vSwitch) decapsulates the network traffic encapsulated with the flow ID to extract the original network traffic. This technology can be advantageously used to perform end-to-end virtualization on all flows generated by all virtual machines.

However, a control plane processing speed of the openflow controller is not appropriate to control dynamic setting and cancellation of numerous new flows that are simultaneously generated by hundreds or thousands of virtual machines. In a context in which a network interface speed increases over 10 Gbps, since the virtual switch is executed in the hypervisor, the capacity for the flow traffic that can be processed by the virtual switch within the hypervisor cannot catch up with the network interface speed (10 Gbps or more).

In addition, as the number of virtual machines that are managed by one hypervisor is significantly increased, the number of flows that should be processed in the hypervisor is exponentially increased. Accordingly, it is difficult to guarantee functions of encapsulating and decapsulating the flows that are exponentially increased in the virtual switch.

In addition, in order to effectively support multiple tenants in one computer server in a virtualized server environment, the network QOS should be guaranteed in units of virtual machines as well as flows, and data traffic signals generated by different tenants should be guaranteed not to interfere with each other. However, existing technologies have a limitation in that it is difficult to effectively support the multiple tenants in one computer server because QOS is provided in units of either VLANs or flows. In addition, a tunneling technique using encapsulation/decapsulation provides logical multi-tenant support, but cannot also guarantee that data traffic signals generated by different tenants will never interfere with each other.

To overcome the limitations in the related art, the present invention presents a method for providing a multi-tenant cloud service that can guarantee QOS in units of flows and virtual machines and support a multi-tenant cloud service by performing management in units of flows and virtual machines according to network information of the virtual machines and a QOS policy and providing different QOS priority for each flow of the virtual machines according to a server characteristic of the virtual machines and QOS information of the flow.

Hereinafter, embodiments of the present invention will be described with reference to the accompanying drawings.

FIG. 1 shows a block diagram of a network system for guaranteeing Quality of Service (QOS) in a multi-tenant cloud service environment according to an embodiment of the present invention. As shown in FIG. 1, the network system may include a virtual machine manager (VMM or cloud OS) 1100, a virtual flow controller cluster 1200, a plurality of computer servers 1300 to 1600, and dynamic virtual flow switches 1700 and 1800.

The virtual machine manager (VMM or cloud OS) 1100 generates, change, deletes and/or moves virtual machines 1310 to 1330, 1410 to 1430, 1510 to 1530, and 1610 to 1630 on the plurality of computer servers 1300 to 1600 in order to provide a multi-tenant service (a web server, a mail server, a file server, a video server, a cloud server, business finance, banking, stock, etc.) in a server virtualization environment.

The virtual machine manager 1100 may provide virtual flow controllers 1210 to 1230 with virtual machine network information and QOS information that are generated or changed whenever a new virtual machine is generated or the state of a virtual machine is changed. In addition, the virtual machine manager 1100 may update virtual machine information on the basis of the virtual machine network information and QOS information that are received from the virtual flow controllers 1210 to 1230.

The virtual flow controller cluster 1200 includes the plurality of virtual flow controllers 1210 to 1230 and delivers a command for managing (generating, changing, deleting, and moving) the virtual machines that operate on the computer servers 1300 to 1600 and a command for managing server resources to hypervisors 1340 to 1640 of the computer servers 1300 to 1600 via computer server network and flow management and control interfaces 1370 to 1670. In response thereto, the hypervisors 1340 to 1640 of the computer servers 1300 to 1600 may directly generate, change, delete and/or move the virtual machine or the server resources according to the command and deliver result information and virtual machine information based on the command to the virtual flow controller cluster 1200.

In an embodiment, the virtual flow controllers 1210 to 1230 may receive attribute information (network information and virtual machine service QOS information) for each virtual machine from the virtual machine manager 1100 to store and manage the attribute information in a virtual machine table.

In an embodiment, the virtual machine table may include network information (for example, an IP address of a virtual machine, a MAC address of a virtual machine, NAT translation information of a virtual machine, virtual machine bandwidth information, etc.) about each virtual machine and QOS information (for example, real-time/non-real-time attribute information about a service provided by the virtual machine, high/low bandwidth requirement information, delay sensitive/non-sensitive service attribute information, service traffic directionality information, and virtual machine bandwidth information, etc.) about a service provided by the virtual machine.

In addition, when new flow traffic is received from edge flow agents 1350 to 1650 that operate on computer servers 1300 to 1600, the virtual flow controller cluster 1200 generates virtual flow information about the new flow and stores and manages the generated virtual flow information in a flow table for the virtual machine.

In an embodiment, the flow table may include network information, operating information (forwarding, drop, edge agent delivery, field correction, tunneling, etc.), and QOS information (real-time/non-real-time attribute information, high/low bandwidth requirement information, delay sensitive/non-sensitive service attribute information, security/non-security service data attribute information, traffic directionality information (for example, subscriber-to-server, server-to-server)) about each flow.

In an embodiment, the virtual flow controller cluster 1200 may deliver a network management command and flow table and virtual machine table information to the edge flow agents 1350 to 1650 of the computer servers 1300 to 1600 via computer server network and flow management and control interfaces 1370 to 1670. In response thereto, the edge flow agents 1350 to 1650 directly perform a network management function on edge flow switches 1342 to 1642 according to the command to update the flow table and virtual machine table information and deliver result information based on the command to the virtual flow controller cluster 1200.

In addition, the virtual flow controller cluster 1200 may deliver a network management command and flow table and virtual machine table information to switch flow agents 1720 and 1820 of the dynamic virtual flow switches 1700 and 1800 via dynamic virtual flow switch management and control interfaces 1710 and 1810. In response thereto, the switch flow agents 1720 and 1820 directly perform a network management function on the dynamic virtual flow switches 1700 and 1800 according to the command to update the flow table and virtual machine table information and deliver result information based on the command to the virtual flow controller cluster 1200.

In an embodiment, the computer servers 1300 to 1600 are connected to the dynamic virtual flow switches 1700 and 1800 via one or more network interfaces 1360 to 1660 and connected to the virtual flow controller cluster 1200 via the computer server network and flow management and control interfaces 1370 to 1670, using an L2 (layer 2) switch, an L3 (layer 3) switch, and the L2 and L3 switches.

In an embodiment, the computer server 1300 may include the plurality of virtual machines 1310 to 1330, the hypervisor 1340 configured to virtualize physical hardware (a CPU, a memory, a storage, a network interface, etc.) to provide logical hardware (a CPU, a virtual memory, a virtual storage, a virtual network interface, etc.) to the virtual machines 1310 to 1330, and the edge flow agent 1350 configured to communicate with the virtual flow controller cluster 1200 via the computer server network and flow management and control interface 1370.

Each of the virtual machines 1310 to 1330 is an operating system (OS) (for example, LINUX, NetBSD, FreeBSD, Solaris, Wondows, etc.) running on logical hardware (a virtual CPU, a virtual memory, a virtual storage, and a virtual network interface) provided by the hypervisor 1340. The virtual machines 1310 to 1330 generate flows according to services (a web server, a file server, a video server, a cloud server, business finance, banking, stock, etc.) provided by the virtual machines 1310 to 1330, and the flows have different QOS requirements according to the services.

The hypervisor 1340 performs functions for managing (generating, changing, removing, and moving) the virtual machines and server resources.

In an embodiment, the hypervisor 1340 may include the edge flow switch 1342 configured to process network traffic that is generated by the plurality of virtual machines 1310 to 1330. The edge flow switch 1342 analyzes flow data generated by the plurality of virtual machines 1310 to 1330 and processes a flow on the basis of the flow table and virtual machine table information. If the analyzed flow data is new flow data that is not defined in the flow table, the edge flow switch 1342 delivers the analyzed flow data to the edge flow agent 1350.

In an embodiment, the edge flow agent 1350 may periodically communicate with the virtual flow controller cluster 1200 via the computer server network and flow management and control interface 1370 to update the flow table and virtual machine table information in the edge flow switch 1342.

In an embodiment, the periodically updated virtual machine table may include network information about the virtual machines 1310 to 1330 and QOS information (for example, real-time/non-real-time attribute information about a service provided by each virtual machine, high/low bandwidth requirement information, delay sensitive/non-sensitive service attribute information, service traffic directionality information, and virtual machine bandwidth information, etc.) for services that are provided by virtual machines.

In an embodiment, the periodically updated flow table may include network information, operating information (for example, packet forwarding, packet drop, edge agent delivery, field correction, tunneling, etc.), and QOS information (for example, real-time/non-real-time attribute information, high/low bandwidth requirement information, delay sensitive/non-sensitive service attribute information, security/non-security service data attribute information, service traffic directionality information) about each flow.

The above description has focused on the computer server 1300 shown in FIG. 1. Since the computer servers 1400 to 1600 have the same configuration as the computer server 1300, repetitive description thereof will be omitted. Furthermore, only four computer servers 1300 to 1600 are shown in FIG. 1, but it will be understood by those skilled in the art that the number of computer servers is exemplary and may be more or less than four.

In an embodiment, the dynamic virtual flow switches 1700 and 1800 may be connected with the plurality of computer servers 1300 to 1600 using at least one of the L2 switch and the L3 switch. A plurality of dynamic virtual flow switches may be included in the network system and connected with each other over an intranet or the Internet.

Also, the plurality of dynamic virtual flow switches are connected with the virtual flow controller cluster 1200 via the dynamic virtual flow switch management and control interfaces 1710 and 1810.

The dynamic virtual flow switches 1700 and 1800 according to an embodiment of the present invention receive virtual machine QOS information and flow QOS information from the virtual flow controller cluster 1200 to store the virtual machine QOS information and flow QOS information in a virtual machine table and a flow table. When a flow is received from the computer servers 1300 to 1600, the dynamic virtual flow switches 1700 and 1800 each determine a QOS priority of the flow on the basis of virtual machine QOS information and flow QOS information associated with the flow and process the flow. A detailed configuration of the dynamic virtual flow switch will be described with reference to FIG. 2.

Figure 2:
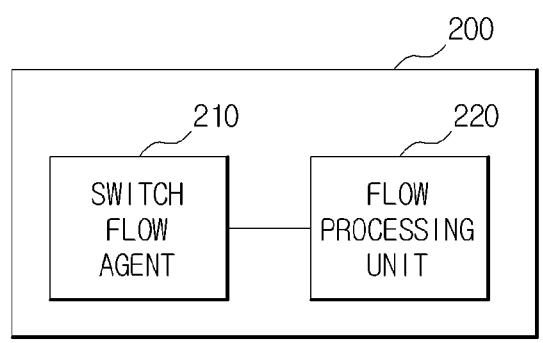
FIG. 2 is a block diagram showing a dynamic virtual switch according to an embodiment of the present invention.

FIG. 2 is a block diagram showing a dynamic virtual switch according to an embodiment of the present invention. As shown in FIG. 2, the dynamic virtual flow switch 200 may include a switch flow agent 210 and a flow processing unit 220.

In an embodiment, the switch flow agent 210 receives virtual machine QOS information about the plurality of virtual machines that operate in the plurality of computer servers 1300 to 1600 and flow QOS information about flows generated by the virtual machine from the virtual flow controller cluster 1200 and stores and manages the virtual machine QOS information and the flow QOS information in the virtual machine table and the flow table.

In an embodiment, the switch flow agent 210 may update the flow table and/or virtual machine table stored in the dynamic virtual flow switch 200 on the basis of the new flow information and/or virtual machine information received through communication with the virtual flow controller cluster 1200 via the dynamic virtual flow switch management and control interface 1730. In an embodiment, the switch flow agent 210 may periodically connect to the virtual flow controller cluster 1200 to receive the new flow information and/or virtual machine information.

In an embodiment, the periodically updated virtual machine table may include network information about the virtual machines and QOS information (for example, real-time/non-real-time attribute information, high/low bandwidth requirement information, delay sensitive/non-sensitive service attribute information, service traffic directionality information, and virtual machine bandwidth information, etc.) for services that are provided by virtual machines.

In addition, the periodically updated flow table may include network information, operating information (forwarding, drop, edge agent delivery, field correction, service traffic directionality (subscriber-to-server/server-to-server, etc.), and QOS information (real-time/non-real-time attribute information, high/low bandwidth requirement information, delay sensitive/non-sensitive service attribute information, service traffic directionality information (subscriber-to-server, server-to-server, etc.))) about each flow.

When a flow generated by one of the virtual machines 1310 to 1340, 1410 to 1440, 1510 to 1540, and 1610 to 1640 of the computer server 1300 to 1600 is received via one or more network interfaces 1360 to 1660, using the L2 switch, the L3 switch, or the L2 and L3 switches, the flow processing unit 220 may analyze the flow to extract flow information and determine a QOS priority of the flow on the basis of the QOS information about the virtual machine that has generated the flow and QOS information about the flow.

In an embodiment, the flow processing unit 220 may determine the QOS priority of the flow such that the flow is preferentially processed if the flow has flow QOS information corresponding to at least one of the virtual machine QOS information about the virtual machine that has generated the flow.

The dynamic virtual flow switch 200 may provide an optimum QOS to each flow according to the type of the service provided by the virtual machine because the dynamic virtual flow switch 200 periodically updates QOS information about all flows in the switch in addition to network information and QOS information about all virtual machines that operate in the computer servers 1300 to 1600 of the network system.

As an example, the flow processing unit 220 may process a flow based on service traffic directionality (subscriber-to-server, server-to-server, etc.) among QOS information about virtual machines. When the service traffic directionality attribute of the virtual machine is server-to-server, a flow having a traffic attribute of server-to-server is given high priority and allowed to be preferentially processed. Also, when the service traffic directionality attribute of the virtual machine is server-to-user, a flow having a traffic attribute of server-to-user is given high priority and allowed to be preferentially processed. Thus, it is possible to provide QOS to the multi-tenant cloud service traffic.

In addition, when the service attribute of the virtual machine is a real-time service, a flow having a real-time QOS attribute among the virtual machine flow traffic is given high priority and allowed to be preferentially processed, thus providing QOS to the multi-tenant cloud service traffic.

In addition, when the service attribute of the virtual machine is a delay sensitive service, a flow having a delay sensitive QOS attribute among the virtual machine flow traffic is given high priority and allowed to be preferentially processed, thus providing QOS to the multi-tenant cloud service traffic.

Figure 3:
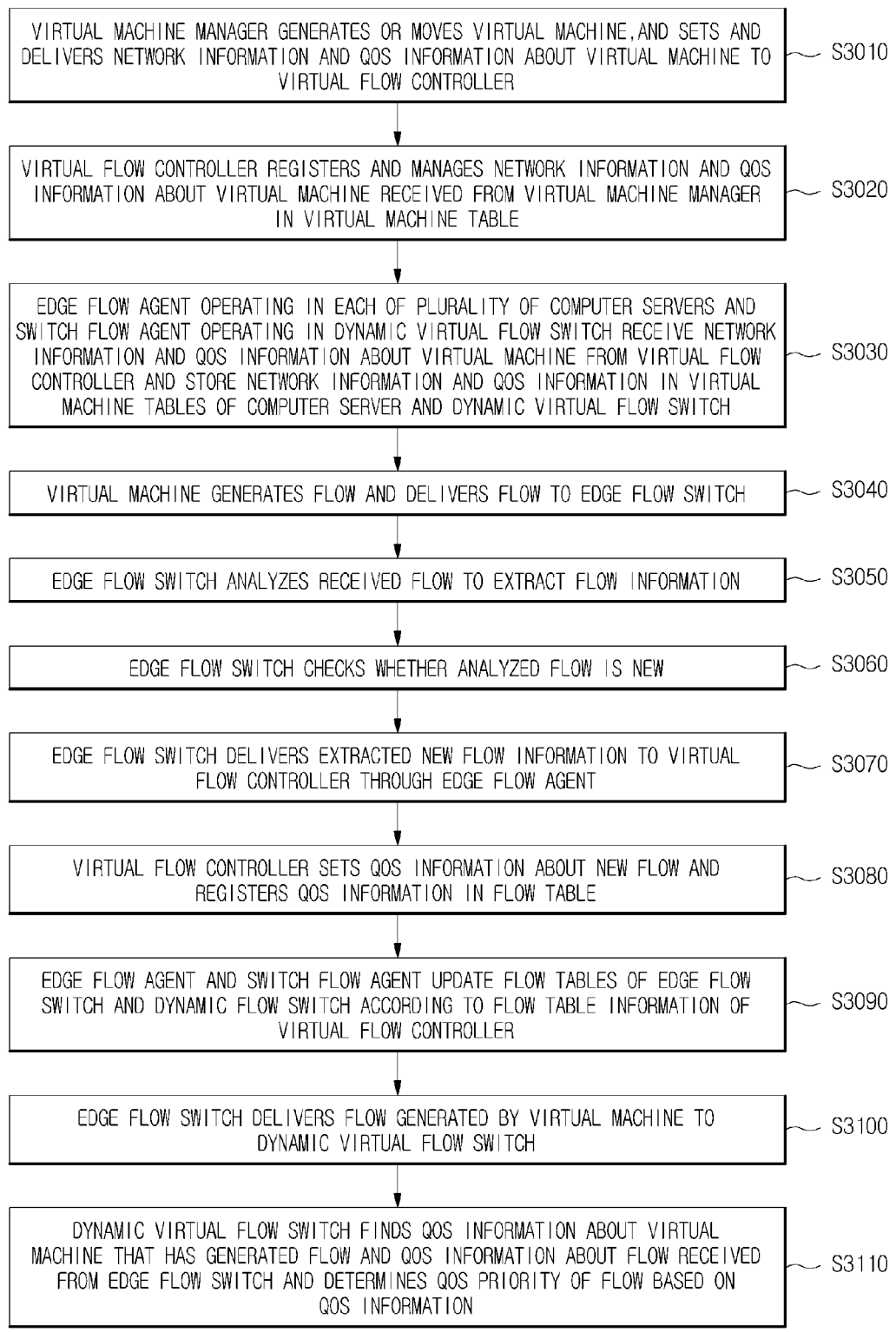
FIG. 3 is a flowchart showing a process of processing a flow generated by a virtual machine in the network system shown in FIG. 1 according to an embodiment of the present invention.

FIG. 3 is a flowchart showing a process of processing a flow generated by a virtual machine in the network system shown in FIG. 1 according to an embodiment of the present invention.

In operation S3010, a virtual machine manager generates or moves a virtual machine in order to provide a multi-tenant service through a plurality of computer servers that have established a sever virtualization environment, and sets network information and QOS information about the generated or moved virtual machine to deliver the network information and QOS information to a virtual flow controller.

In operation S3020, the virtual flow controller registers and manages the network information and QOS information about the virtual machine received from the virtual machine manager in a virtual machine table.

In operation S3030, an edge flow agent operating in each of a plurality of computer servers and a switch flow agent operating in a dynamic virtual flow switch receive the network information and QOS information about the virtual machine from the virtual flow controller and store the network information and QOS information in virtual machine tables of the computer server and the dynamic virtual flow switch.

In operation S3040, the virtual machine generates a flow according to its service (for example, a web server, a mail server, a file server, a video server, a cloud server, business finance, banking, stock, etc.) and delivers the generated flow to an edge flow switch.

In operation S3050, the edge flow switch analyzes the received flow to extract flow information.

In operation S3060, the edge flow switch checks whether the analyzed flow is new.

In operation S3070, if the flow is a new flow, the edge flow switch delivers the extracted flow information to the virtual flow controller through the edge flow agent. In operation S3080, the virtual flow controller sets QOS information about the new flow and registers the QOS information in a flow table.

In operation S3090, the edge flow agent and the switch flow agent update flow tables of the edge flow switch and the dynamic flow switch according to flow table information of the virtual flow controller.

In operation S3100, the edge flow switch delivers the flow generated by the virtual machine to the dynamic virtual flow switch, using an L2 switch, an L3 switch, or the L2 and L3 switches.

In operation S3110, the dynamic virtual flow switch analyzes a flow received from the edge flow switch to extract flow information, finds QOS information about a virtual machine that has generated the flow and QOS information about the flow using the extracted information, and determines a QOS priority of the flow on the basis of the QOS information.

Figure 4:
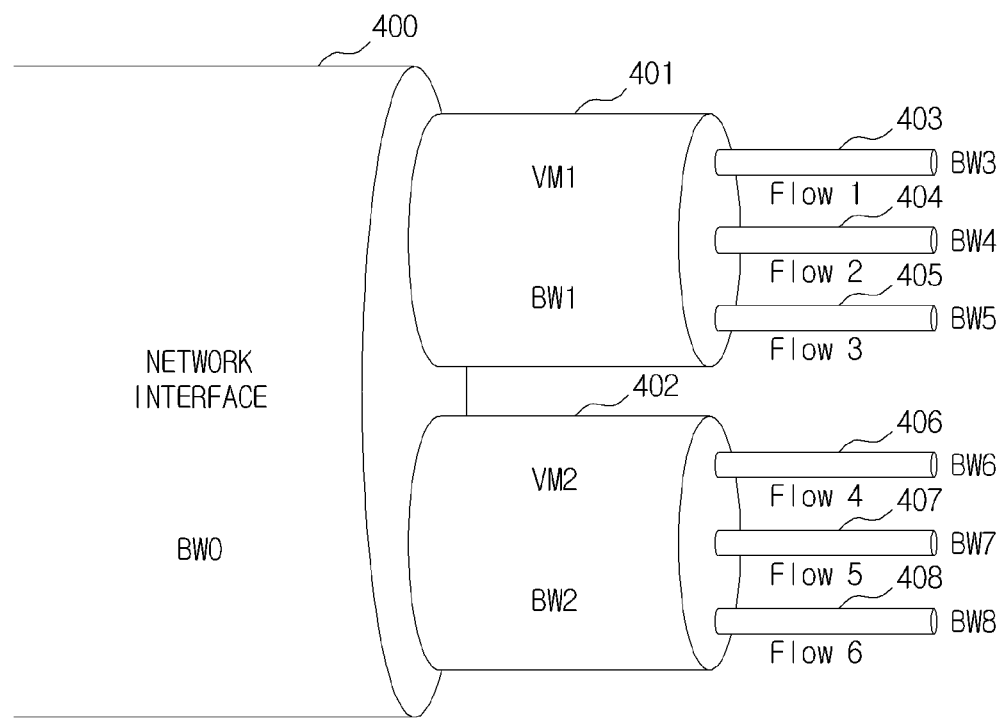
FIG. 4 conceptually shows an example of a network interface for connecting a dynamic virtual flow switch with a computer server having an edge flow switch according to an embodiment of the present invention.

FIG. 4 conceptually shows an example of a network interface for connecting a dynamic virtual flow switch with a computer server having an edge flow switch according to an embodiment of the present invention. As shown in FIG. 4, a plurality of flows 403 to 406 (Flow 1 to Flow 6) that are generated by virtual machines 401 and 402 (VM1 and VM2) operating in a computer server having an edge flow switch may be delivered to the dynamic virtual flow switch via a network interface 400. In this case, the virtual machines 401 and 402 (VM1 and VM2) have bandwidth setting values BW1 and BW2, respectively. In addition, flows 303 to 306 (Flow 1 to Flow 6) may have bandwidth setting values BW3 to BW8 on a flow basis, respectively. As an example, the bandwidth setting value is represented as an average value and a burst and average value.

Figure 5:
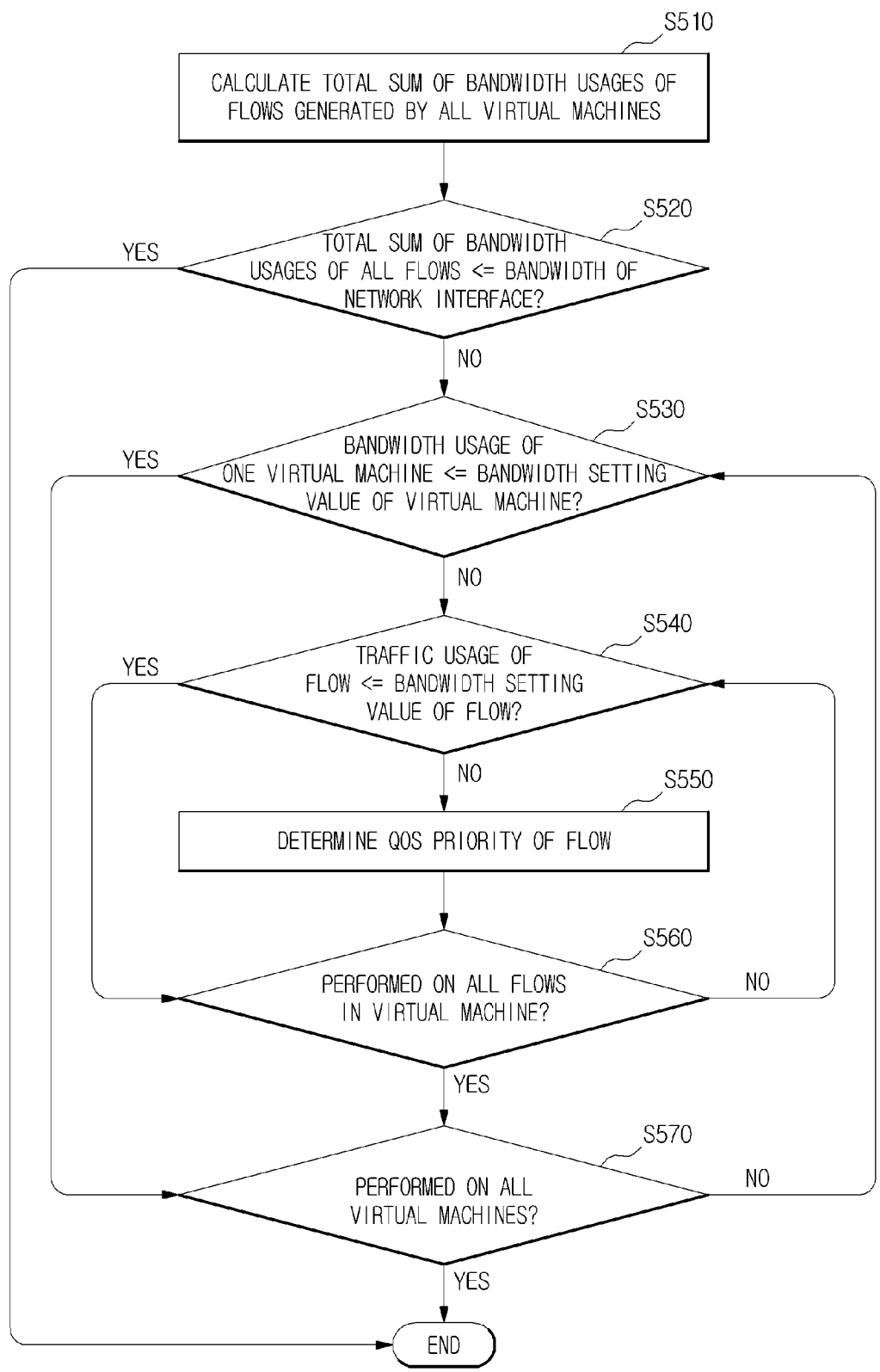
FIG. 5 is a flowchart illustrating a QOS management method that is performed by a dynamic virtual flow switch according to an embodiment of the present invention.

FIG. 5 is a flowchart illustrating a QOS management method that is performed by a dynamic virtual flow switch according to an embodiment of the present invention.

In operation S510, the dynamic virtual flow switch calculates a total sum (for example, BW3+BW4+BW5+BW6+BW7+BW8 as shown in FIG. 4) of bandwidth usages of the flows generated by all the virtual machines in the switch. In an embodiment, the bandwidth and the bandwidth usage may each be represented as an average value and a burst and average value.

In operation S520, the dynamic virtual flow switch compares the total sum (for example, BW3+BW4+BW5+BW6+BW7+BW8 as shown in FIG. 4) of bandwidth usages of all the flows with a bandwidth BW0 of the network interface between the dynamic virtual flow switch and the computer server. If the total sum is less than the bandwidth of the network interface, this satisfies the bandwidths required by all the flows and thus the process ends.

On the other hand, if the total sum is greater than the bandwidth BW0, the dynamic virtual flow switch compares a bandwidth usage of one virtual machine with a bandwidth setting value of the virtual machine in operation S530.

If it is determined as a result of comparison between the bandwidth usage of the virtual machine and the bandwidth setting value that the bandwidth usage of the virtual machine is greater than the bandwidth setting value for the virtual machine, the dynamic virtual flow switch compares a bandwidth usage of each flow in the virtual machine with a bandwidth setting value for the flow in operation S540.

If the bandwidth usage of the flow is determined to be greater than the bandwidth setting value for the flow as a result of comparison between the bandwidth usage of the flow and the bandwidth setting value for the flow, the dynamic virtual flow switch determines a QOS priority of the flow in the virtual machine in operation S550.

In operation S560, the above-described operations S540 and S550 are repetitively performed on all flows generated by the virtual machine.

In addition the above-described operations S530 and S550 are repetitively performed on all virtual machines after the above-described operations S540 and S550 are repetitively performed on all flows generated by the virtual machine.

In an embodiment, the QOS priority of the flow may be determined such that the flow is preferentially processed if the flow has flow QOS information corresponding to at least one of the virtual machine QOS information about the virtual machine that has generated the flow. For example, a flow having a traffic attribute of server-to-server may be given high priority and allowed to be processed when the service attribute of the virtual machine is server-to-server and a flow having a traffic attribute of server-to-user may be given high priority and allowed to be processed when the service attribute of the virtual machine is server-to-user, thereby providing Quality of Service (QOS) to the multi-tenant cloud service traffic.

In addition, when the service attribute among QOS information of the virtual machine is a real-time service, a flow having a real-time QOS attribute among the virtual machine flow traffic is given high priority and allowed to be processed. Thus, it is possible to provide QOS to the multi-tenant cloud service traffic.

In addition, when the service attribute among QOS information of the virtual machine is a delay sensitive service, a flow having a delay sensitive QOS attribute among the virtual machine flow traffic is given high priority and allowed to be processed. Thus, it is possible to provide QOS to the multi-tenant cloud service traffic.

Other than the above-described example, a variety of QOS policies may be performed using virtual machine attribute information and flow attribute information. Thus the present invention is not limited a specific QOS policy.

According to an embodiment of the present invention, it is possible to guarantee QOS in units of flows and virtual machines by providing a separate QOS priority for each flow of a virtual machine according to QOS information about service characteristics and flows of a virtual machine.

Thus, in the multi-tenant cloud service environment, it is possible for a dynamic virtual flow switch to flexibly provide QOS in units of flows and/or virtual machines even when the number of flows in an entire virtual machine increases.

The method and apparatus according to an embodiment of the present invention may be implemented as program instructions executable by a variety of computers and recorded on a computer-readable medium. The computer-readable medium may include a program instruction, a data file, a data structure, or a combination thereof.

The program instructions recorded on the computer-readable medium may be designed and configured specifically for the present invention or can be publicly known and available to those who are skilled in the field of computer software. Examples of the computer-readable medium include a magnetic medium, such as a hard disk, a floppy disk, and a magnetic tape, an optical medium, such as a CD-ROM and a DVD, a magneto-optical medium such as a floptical disk, and a hardware device, such as a ROM, a RAM, a flash memory, etc. which are specially configured to store and execute program instructions. Meanwhile, the recording medium may be a transmission medium such as an optical or metallic line or a waveguide, including a carrier for transmitting signals to indicate program instructions, a data structure, etc. Examples of the program instructions include not only machine codes made by a compiler but also high-level language codes executable by a computer by using an interpreter.

The above exemplary hardware device can be configured to operate as one or more software modules in order to perform the operation of the present invention, and vice versa.

This invention has been particularly shown and described with reference to preferred embodiments thereof. It will be understood by those skilled in the art that various changes in form and details may be made therein without departing from the spirit and scope of the invention as defined by the appended claims. Accordingly, the referred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A dynamic virtual flow switch comprising:
 a switch flow agent configured to receive and store virtual machine QOS information about each of a plurality of virtual machines operating in a plurality of computer servers and flow QOS information about a flow generated by the virtual machine from a virtual flow controller; and a flow processing unit configured to receive the flow generated by the virtual machine and determine a QOS priority of the flow based on the stored virtual machine QOS information of the virtual machine and flow QOS information of the flow, wherein the dynamic virtual flow switch is plural in number, and the plurality of dynamic virtual flow switches are connected over an intranet or the Internet, wherein the dynamic virtual flow switch is configured to calculate a total sum of bandwidth usages of the flows generated by the plurality of virtual machines, wherein the dynamic virtual flow switch is configured to compare the total sum of flow bandwidth usages of the flows with a network bandwidth between the dynamic virtual flow switch and the computer server, wherein, when the total sum of flow bandwidth usages is greater than the network bandwidth, the dynamic virtual flow switch compares a flow bandwidth usage of a flow generated by each of the plurality of virtual machines with a bandwidth setting value of the virtual machine, wherein, when the flow bandwidth usage is greater than the bandwidth setting value of the virtual machine, the dynamic virtual flow switch compares a flow bandwidth usage generated by each of flows generated by the plurality of virtual machines with a bandwidth setting value of the flow, and wherein, when the flow bandwidth usage is greater than the bandwidth setting value of the flow, the dynamic virtual flow switch determines a QOS priority for the flow based on the virtual machine QOS information about the virtual machine that has generated the flow and the flow QOS information about the flow.

2. The dynamic virtual flow switch of claim 1, further comprising at least one of an L2 switch and an L3 switch, wherein the dynamic virtual flow switch is connected to the plurality of computer servers through at least one of the L2 switch and L3 switch.

3. The dynamic virtual flow switch of claim 1, wherein the virtual machine QOS information comprises at least one of real-time/non-real-time attribute information, high/low bandwidth requirement information, delay sensitive/non-sensitive service attribute information, service traffic directionality information, and virtual machine bandwidth information about a service provided by the virtual machine.

4. The dynamic virtual flow switch of claim 1, wherein the flow QOS information comprises at least one of real-time/non-real-time attribute information, high/low bandwidth requirement information, delay sensitive/non-sensitive service attribute information, and service traffic directionality information.

5. The dynamic virtual flow switch of claim 1, wherein, when the virtual machine is generated by a virtual machine manager, the virtual machine QOS information is set by the virtual machine manager and delivered to the virtual flow controller.

6. The dynamic virtual flow switch of claim 1, wherein, when flow traffic is generated by the virtual machine, the generated flow traffic is delivered to the virtual flow controller and the flow QOS information about the flow is set by the flow controller.

7. The dynamic virtual flow switch of claim 1, wherein the flow processing unit determines a QOS priority of the flow such that the flow is preferentially processed if the flow has flow QOS information corresponding to at least one of the virtual machine QOS information about the virtual machine that has generated the flow.

8. The dynamic virtual flow switch of claim 1, wherein the switch flow agent periodically receives and updates the virtual machine QOS information and the flow QOS information from the virtual flow controller.

9. A network system comprising:
a virtual machine manager configured to generate a plurality of virtual machines and set virtual machine QOS information about each of the generated plurality of virtual machines;
a virtual flow controller configured to receive and store the virtual machine QOS information about each of the plurality of virtual machines from the virtual machine manager and set and store flow QOS information about a flow generated by the virtual machine;
a plurality of computer servers configured to execute at least one of the plurality of virtual machines generated by the virtual machine manager and have an edge flow agent for forwarding a new traffic to the virtual flow controller when the new flow traffic is generated by the virtual machine; and
a dynamic virtual flow switch configured to receive and store the virtual machine QOS information and the flow QOS information from the virtual flow controller and when a flow is received from each of the plurality of computer servers, determine a QOS priority of the flow based on the stored virtual machine QOS information and flow QOS information and process the flow.

10. The network system of claim 9, wherein the dynamic virtual flow switch is plural in number, and the plurality of dynamic virtual flow switches are connected over an intranet or the Internet.

11. The network system of claim 9, wherein the dynamic virtual flow switch is connected with the plurality of computer servers through at least one of an L2 switch and an L3 switch.

12. The network system of claim 9, wherein the virtual machine QOS information comprises at least one of real-time/non-real-time attribute information, high/low bandwidth requirement information, delay sensitive/non-sensitive service attribute information, service traffic directionality information, and virtual machine bandwidth information about a service provided by the virtual machine.

13. The network system of claim 9, wherein the flow QOS information comprises at least one of real-time/non-real-time attribute information, high/low bandwidth requirement information, delay sensitive/non-sensitive service attribute information, and service traffic directionality information.

14. The network system of claim 9, wherein the dynamic virtual flow switch determines a QOS priority of the flow such that the flow is preferentially processed if the flow has flow QOS information corresponding to at least one of the virtual machine QOS information about the virtual machine that has generated the flow.

15. A method of managing QOS for flows at a dynamic virtual flow switch, the flows being generated by a plurality of virtual machines operating in a plurality of computer servers and the dynamic virtual flow switch being connected with the plurality of computer servers to receive and process the flows, the method comprising:
calculating a total sum of bandwidth usages of the flows generated by the plurality of virtual machines;
comparing the total sum of flow bandwidth usages of the flows with a network bandwidth between the dynamic virtual flow switch and the computer server;
when the total sum of flow bandwidth usages is greater than the network bandwidth, comparing a flow bandwidth usage of a flow generated by each of the plurality of virtual machines with a bandwidth setting value of the virtual machine;

when the flow bandwidth usage is greater than the bandwidth setting value of the virtual machine, comparing a flow bandwidth usage generated by each of flows generated by the plurality of virtual machines with a bandwidth setting value of the flow; and when the flow bandwidth usage is greater than the bandwidth setting value of the flow, determining a QOS priority for the flow based on the virtual machine QOS information about the virtual machine that has generated the flow and the flow QOS information about the flow.

16. The method of claim 15, wherein the determining of the QOS priority for the flow comprises determining the QOS priority of the flow such that the flow is preferentially processed if the flow has flow QOS information corresponding to at least one of the virtual machine QOS information about the virtual machine that has generated the flow.

* * * * *